(12) United States Patent
Roth

(10) Patent No.: US 7,913,442 B2
(45) Date of Patent: Mar. 29, 2011

(54) LINE GUIDES FOR FISHING RODS

(76) Inventor: Alexander Roth, Riverside, CA (US)

( * ) Notice: Subject to any disclaimer, the term of this patent is extended or adjusted under 35 U.S.C. 154(b) by 212 days.

(21) Appl. No.: 11/177,499

(22) Filed: Jul. 7, 2005

(65) Prior Publication Data
US 2006/0032108 A1 Feb. 16, 2006

Related U.S. Application Data

(63) Continuation-in-part of application No. 10/888,131, filed on Jul. 9, 2004, now abandoned.

(51) Int. Cl.
A01K 87/04 (2006.01)
(52) U.S. Cl. .......................................................... 43/24
(58) Field of Classification Search ................ 43/24, 25, 43/25.2
See application file for complete search history.

(56) References Cited

U.S. PATENT DOCUMENTS

| | | | | |
|---|---|---|---|---|
| 16,992 A * | 4/1857 | Osgood | ......................... | 254/395 |
| 364,350 A | 6/1887 | Huth | ............................. | 43/24 |
| 506,093 A | 10/1893 | Boardman | .................. | 43/24 |
| 521,704 A | 6/1894 | Davis | ................................ | 43/24 |
| 801,884 A | 10/1905 | Kunze et al. | ................. | 43/24 |
| 1,063,402 A * | 6/1913 | Whistler | .......................... | 43/24 |
| 1,478,643 A | 12/1923 | Elliott | | |
| 1,835,310 A | 12/1931 | Kline et al. | ................... | 43/24 |
| 2,199,861 A | 5/1940 | Sebrean et al. | ................ | 43/24 |
| 2,231,053 A | 2/1941 | Byrd | ................................ | 43/24 |
| 2,483,760 A * | 10/1949 | Duncan | .......................... | 254/395 |
| 2,805,509 A | 9/1957 | Inglis | ................................ | 43/24 |
| 2,863,252 A | 12/1958 | Hettinger | ........................ | 43/24 |
| 2,878,608 A | 3/1959 | O'Brien, Jr. | .................... | 43/24 |
| 3,315,400 A | 4/1967 | Axelson | .......................... | 43/24 |
| 3,350,809 A | 11/1967 | Chion | .............................. | 43/24 |
| 3,641,696 A | 2/1972 | Fleischer | ........................ | 43/24 |
| 4,807,385 A | 2/1989 | Morishita | ........................ | 43/24 |
| 5,276,991 A | 1/1994 | Stotesbury et al. | ............... | 43/24 |
| 5,383,300 A | 1/1995 | Stotesbury et al. | ............... | 43/24 |
| 5,417,007 A | 5/1995 | Stotesbury et al. | ............... | 43/24 |
| 5,531,041 A | 7/1996 | Betto | ................................ | 43/24 |
| 6,286,245 B1 | 9/2001 | Broberg | ....................... | 43/27.4 |

FOREIGN PATENT DOCUMENTS

GB 26556 11/1910
GB 2 195 872 A1 4/1988

OTHER PUBLICATIONS

Pacific Bay—Saltwater Guides and Tops, URL:http://www.fishpacbay.com/prod_gtsaltwater.html; pp. 1-5, download date Apr. 1, 2004.

* cited by examiner

*Primary Examiner* — David J Parsley
(74) *Attorney, Agent, or Firm* — Seed IP Law Group PLLC

(57) ABSTRACT

The present disclosure generally relates to a line guide for a fishing rod and that employs a system of roller assemblies within a frame, the roller assemblies configured to form a passageway for the fishing line to pass through. As an angler reels in a fish and the fishing line is in contact with one of the roller assemblies, the tension of the fishing line will cause a component of the roller assembly to rotate, thus greatly reducing any sliding friction between the fishing line and the line guide. The line guides can be a variety of sizes and the frames of the line guides can vary in shape and their mounting orientation relative to the fishing rod.

5 Claims, 20 Drawing Sheets

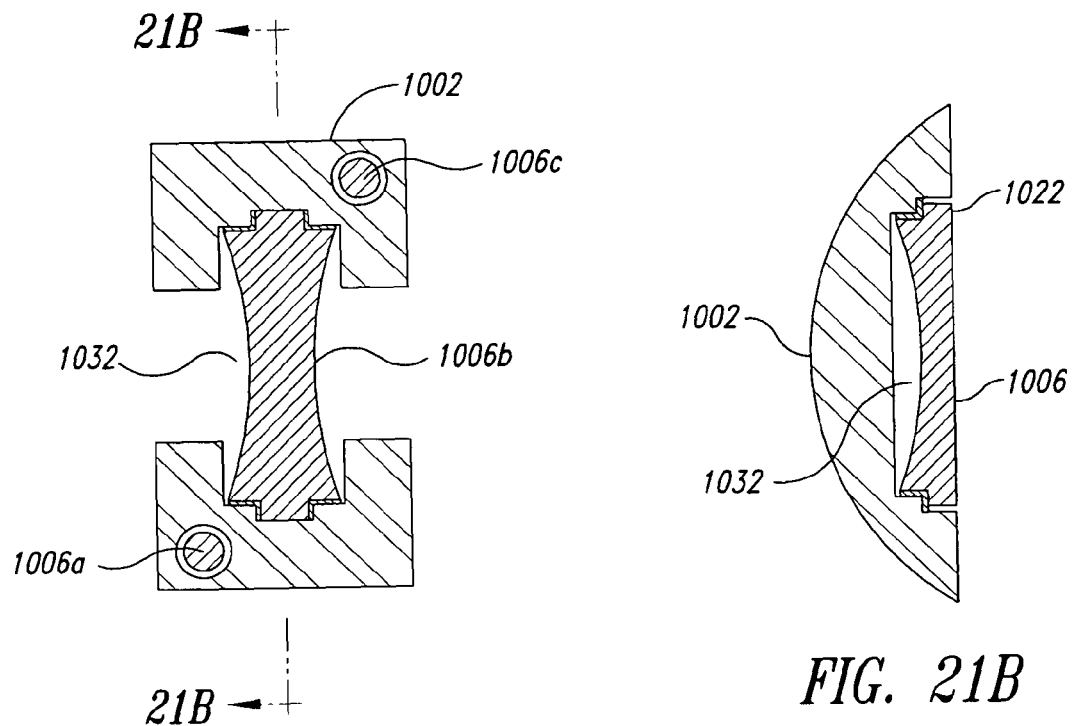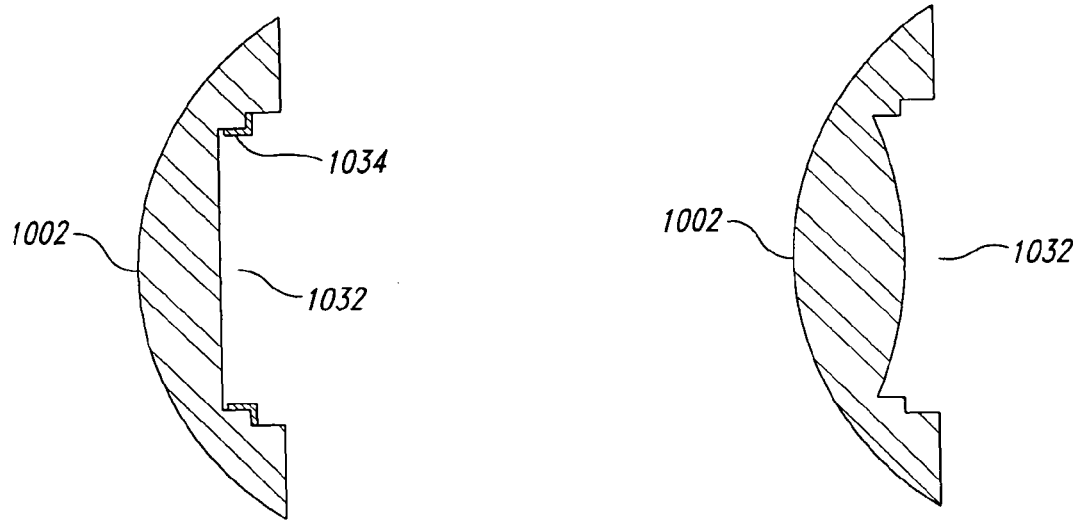

LINE GUIDES FOR FISHING RODS

CROSS-REFERENCES TO RELATED APPLICATION

This application is a continuation-in-part of U.S. patent application Ser. No. 10/888,131 filed Jul. 9, 2004, now pending, which application is incorporated herein by reference in its entirety.

BACKGROUND OF THE INVENTION

1. Field of the Invention

This description generally relates to line guides that can be used with a variety of fishing rods.

2. Description of the Related Art

Fishing rods are generally coupled with either a conventional reel or a spinning reel. The reel is primarily used for casting, retracting and controlling the fishing line. The actual fishing rod is an assembly of tapered blanks with a series of line guides extending down the length of the rod for guiding the fishing line from the reel to the tip of the rod. Line guides are generally circular rings placed at various locations along the rod and attached to the rod with wrapping material. The rings typically have a larger diameter near the reel-end of the rod and a small diameter near the tip-end of the rod.

Another type of line guide has a pulley, or roller, that facilitates the fishing line running over the line guide. One example of such a line guide is sold under the trademark BIG FOOT® guides by AFTCO Manufacturing Company, Inc. of Irvine, Calif. A groove in the pulley inhibits the fishing line from slipping off the roller and abrading against the line guide housing; however, the pulley is not foolproof, and slippage of the line off of the pulley is possible. Line guides with pulleys are described in detail in U.S. Pat. No. 5,531,041, issued to Betto and entitled "Guiding Device for Fishing-Rod Lines."

FIGS. 1 and 2 illustrate the conventional-reel rod and the spinning-reel rod, respectively. FIG. 1 illustrates the conventional-reel rod 1 with a conventional reel 2 mounted on the topside of the rod. Standard, ring-shaped line guides 3 extend down the length of the rod, and are also mounted on the topside of the rod. Although ring-shaped line guides 3 are shown in the FIG. 1, the standard, horizontal roller guides discussed above could be used instead of the ring-shaped line guides, but only if the conventional reel 2 is coupled with the rod.

FIG. 2 illustrates the spinning-reel rod 5 coupled with the spinning reel 6. In such a configuration, the first line guide 7 to receive the fishing line from the spinning reel typically has a larger diameter than the first line guide 3 used in the conventional-reel rod configuration. Due to the circular pattern in which the fishing line pays out from or reels on to the spinning reel 6, the larger diameter of the first line guide 7 creates less tension, pull, and friction on the fishing line. Gravity acting on the fishing line tends to keep the fishing line in contact with the lowest point 8 of each of the line guides (i.e., the top of the ring 8 if viewing the ring-shaped line guide in an upright position). The action of gravity, which forces the fishing line downward, is one reason why standard roller guides are not used in the spinning-reel rod configuration. The use of standard, horizontal roller guides in such a configuration would not serve any benefit because the fishing line would not stay in contact with the pulley.

Although the choice of reel is one of the parameters that affects the angler's choice of line guides, another parameter is the character of the fishing rod itself. In particular, the type of material that the rod blanks are made from and the amount of taper along the rod dictates, for the most part, the amount of "rod action." "Rod action" is a term that indicates the amount of flexibility or stiffness in the rod and is generally dictated by the degree of taper along the length of the rod. The amount of rod action is important to anglers because a stiff (i.e., fast action) rod is better suited for large game fish where the hook has to be firmly set and the rod must be powerful enough to handle the action of the large fish. A slow-action rod is better suited for small fish where the flexible nature of the rod helps prevent the bait from coming off the hook. Many anglers use a medium action rod as a versatile, go-between rod for smaller fish or larger, fresh water fish. The two primary materials used to construct fishing rod blanks are either fiberglass or carbon reinforced composite (i.e., graphite).

Once an angler selects a rod with a desired amount of rod action, it is important that the line guides do not detract from or adversely affect the rod action. Experienced anglers know that the quantity, mounting style, and placement of the line guides along the length of the rod can have a fairly significant effect on the overall performance of the rod. Line guides can affect the rod action, but most importantly, the line guides affect the smooth transition of the fishing line from the reel to the end of the rod.

In many angling situations, whether fly fishing or large game fishing, an angler will often have a need to pull, twist, turn, or otherwise manipulate the spatial orientation of the rod. Two such examples are pulling the rod horizontally to pull a fish out of an area covered with reeds or when fishing off a pier or a boat, and trying to keep the tip low to the water when using artificial bait. This type of manipulation can cause the fishing line to abrade against the ring-type line guides. Abrasion causes the line filament to degrade, fray, and break. Line breakage not only results in the cost of replacing the fishing line, which can get expensive, but often the loss of fishing tackle and bait, not to mention the loss of that one special fish, thus relinquishing the angler to the role of telling the story about "the one that got away."

SUMMARY OF THE INVENTION

One object of the present invention is to provide a series of line guides that can be used with any type of fishing rod, whether it is a conventional or a spinning rod and whether it is for light-duty or heavy-duty fishing. Another object of the present invention is to provide a series of line guides that minimizes any potential regions where abrasion can occur between the line guides and the fishing line.

In one aspect, a line guide for a fishing rod includes a frame enclosing a passageway extending therethrough; a first roller having a first rotation axis, the first roller rotatably coupled to the frame and rotatable about the first rotation axis in approximately a first plane, wherein the first plane is substantially perpendicular to the passageway of the frame; a second roller having a second rotation axis, the second roller rotatably coupled to the frame and rotatable about the second rotation axis in approximately a second plane, wherein the second plane is parallel to and axially offset from the first plane; and a third roller having a third rotation axis, the third roller rotatably coupled to the frame and rotatable about a third rotation axis in approximately a third plane, wherein the third plane is parallel to and axially offset from the first and second planes, respectively.

In another aspect, a line guide for a fishing rod includes a frame enclosing a passageway extending therethrough, the frame having a plurality of recessed pockets; and a plurality of rollers rotatably coupled to the frame and received at least partially in respective recessed pockets, each roller comprising a pair of end portions connected by a central portion, wherein for each of the plurality of rollers, the end portion of one roller cooperates with the end portion of another roller to substantially prevent fishing line from passing between the rollers and contacting the frame.

In yet another aspect, a frame for a line guide used on a fishing rod includes a frame body enclosing a passageway; a plurality of recessed pockets formed in the frame body; and a cap coupled to the frame body, the cap configured to cooperate with the frame body to retain and rotatably support therebetween a rotatable member located at least partially within one of the respective recessed pockets.

BRIEF DESCRIPTION OF THE DRAWINGS

FIG. 21A is a cross-sectional view of the line guide of FIG. 16 taken along line 21A-21A in FIG. 17.

FIG. 21B is a cross-sectional view of the line guide of FIG. 21A, taken along line 21B-21B in FIG. 21A.

FIG. 22 is a cross-sectional view of the frame of FIG. 21A showing a bushing located in the frame, but without the rotatable member for clarity.

FIG. 23 is a cross-sectional view of a contoured recessed pocket of a frame for a line guide according to one illustrated embodiment.

DETAILED DESCRIPTION OF THE INVENTION

In the following description, certain specific details are set forth in order to provide a thorough understanding of various embodiments of the invention. However, one skilled in the art will understand that the invention may be practiced without many of these details. In other instances, well-known structures and the numerous specialty versions associated with fishing rods and reels have not been shown or described in detail in order to avoid unnecessarily obscuring descriptions of the embodiments of the invention.

The general function of a line guide attached to a fishing rod is to control and contain the fishing line as it extends from the reel to the tip of the rod. Line guides generally keep the fishing line from becoming tangled. An angler places the fishing line in tension when a fish is hooked. With the line under tension, directional changes of the fish, the rod, or both causes the fishing line to contact at least some static, non-rotational portion of the enclosed line guide. This contact, which often occurs in combination with the angler reeling in the fishing line and making radical directional changes with the rod, creates friction between the fishing line and the line guide. The friction, over time, abrades the fishing line and causes portions of the fishing line to fray and even fracture. The friction also makes it more challenging for the angler to reel in the fishing line.

Figure 1:
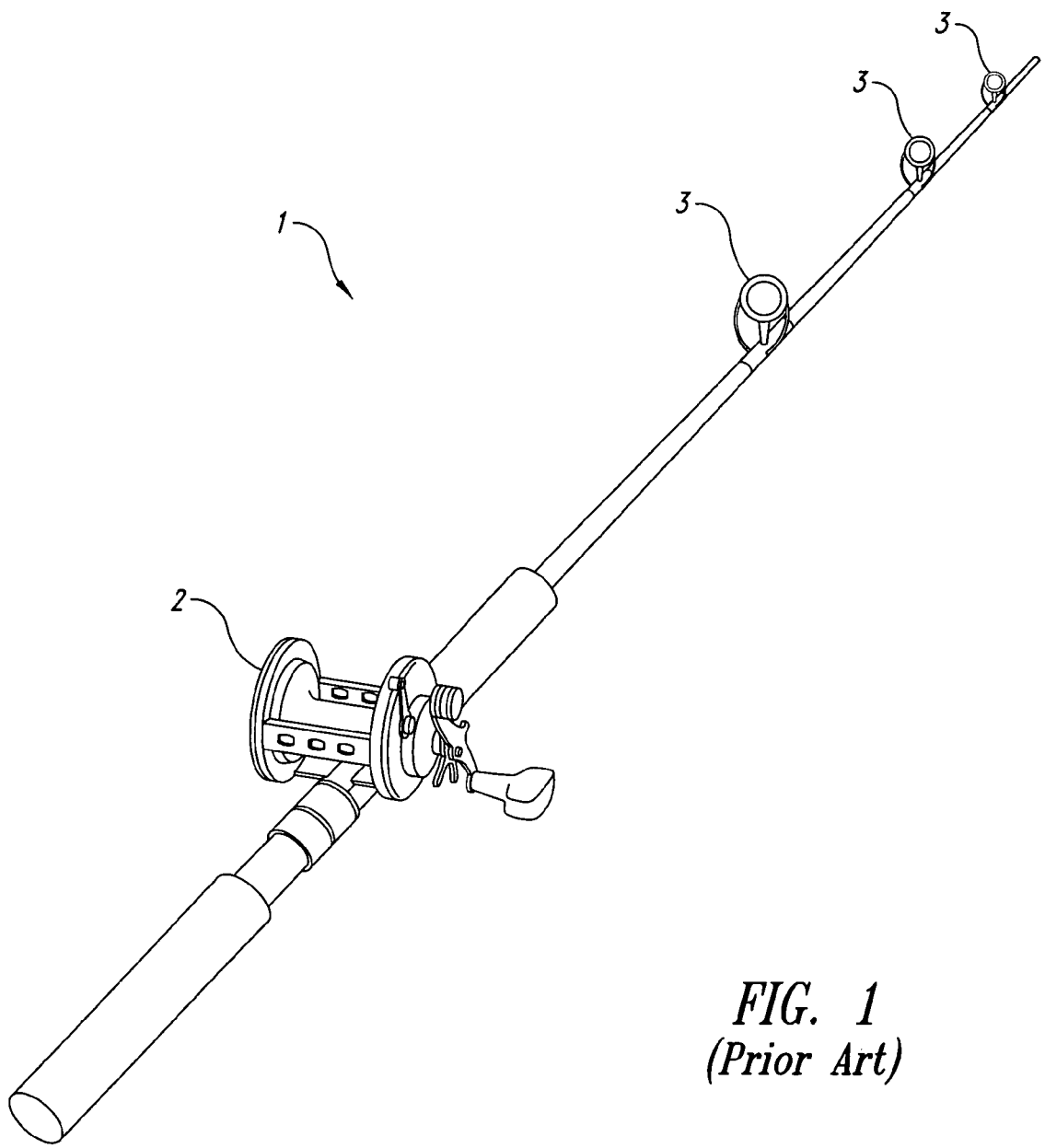
FIG. 1 is a rear, right side isometric view of a prior art fishing rod with a conventional reel and ring-shaped line guides.
Figure 2:
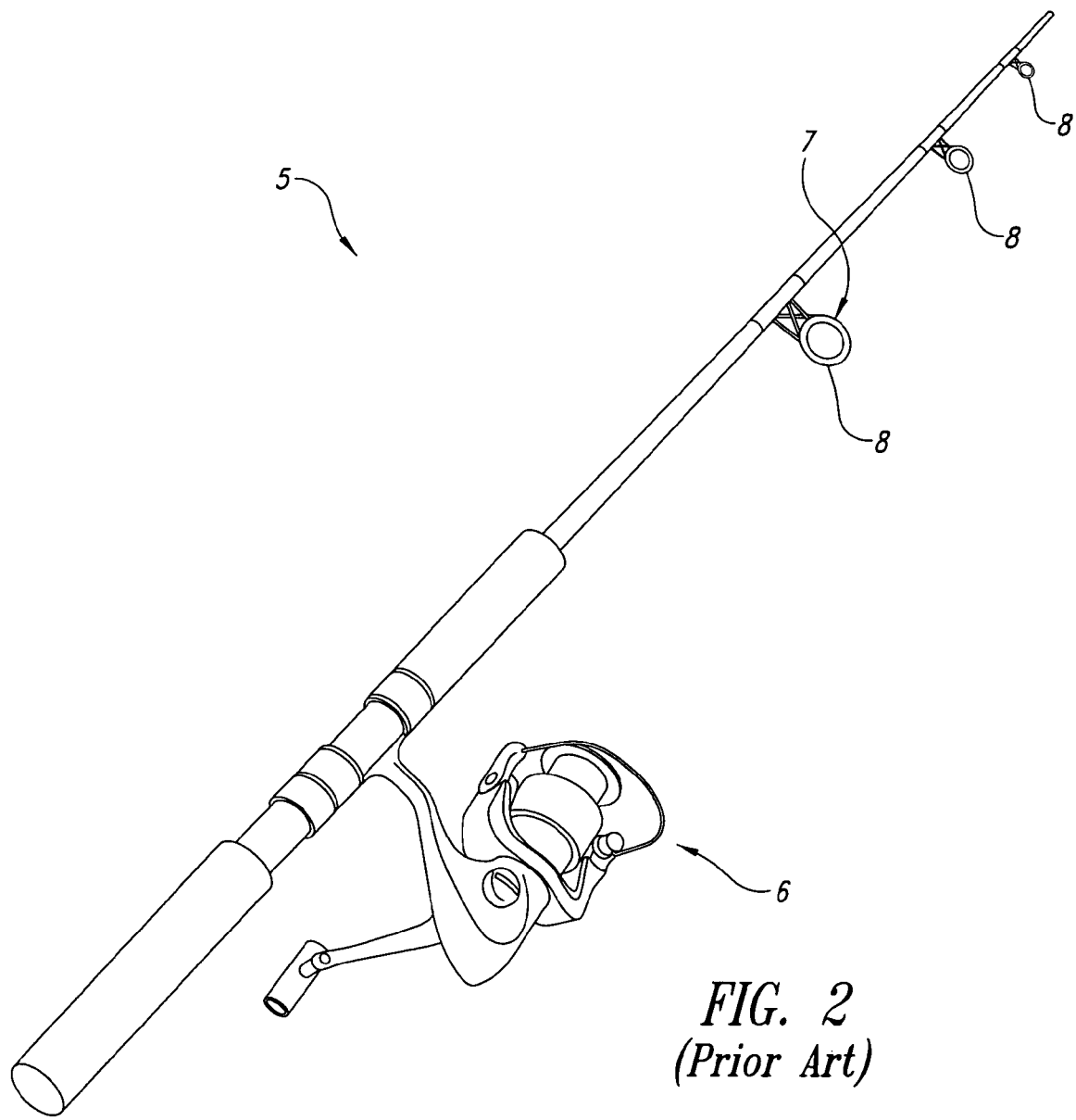
FIG. 2 is a rear, right side isometric view of a prior art fishing rod with a spinning reel and ring-shaped line guides.
Figure 3:
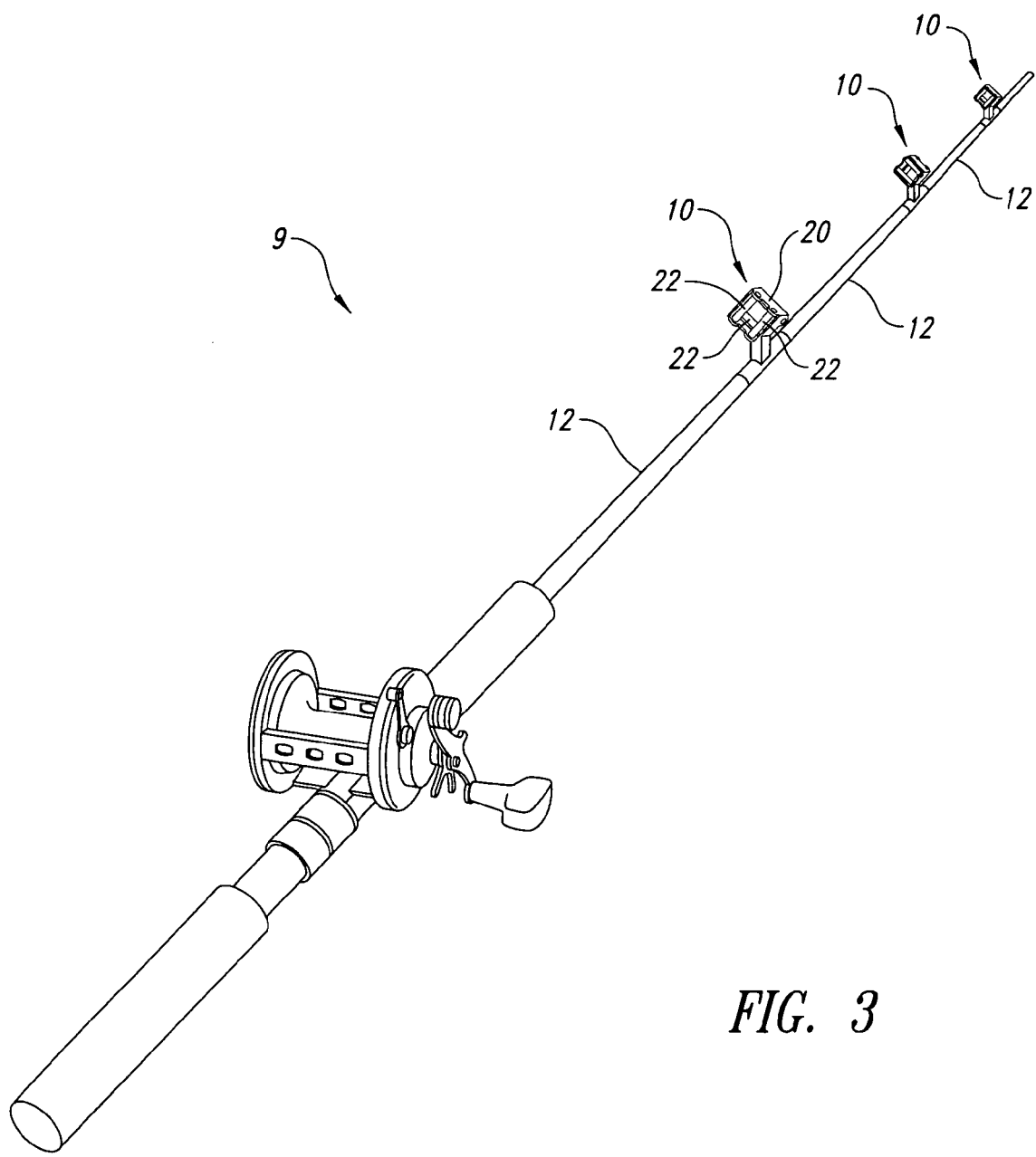
FIG. 3 is a rear, right side isometric view of a fishing rod with a conventional reel and line guides according to one illustrated embodiment.

The discussion herein provides details about line guides that permit the fishing line to pass through a passageway with little resistance, even when the fishing line is under tension and in contact with a portion of the line guide. FIG. 3 illustrates a fishing rod 9 having a series of line guides 10 positioned along a set of tapered, connected rod blanks 12. Each of the line guides 10 has a series of guide roller assemblies 22 arranged within a frame 20 to prevent the fishing line (not shown) from contacting the frame during use. When the fishing line is placed under tension, the contact of the line with at least one of the rollers 22 causes the roller 22 to rotate, thus greatly reducing or eliminating any sliding contact between the fishing line and the line guide 10. In the illustrated embodiment, the line guides 10 can be seated on the rod blank 12 such that each line guide 10 is a mirror image of an adjacent line guide (i.e., notice the positioning of the roller assemblies 22 within the frame for each illustrated line guide 10). This arrangement may facilitate the transition of the fishing line from one line guide 10 to the next.

Figure 4:
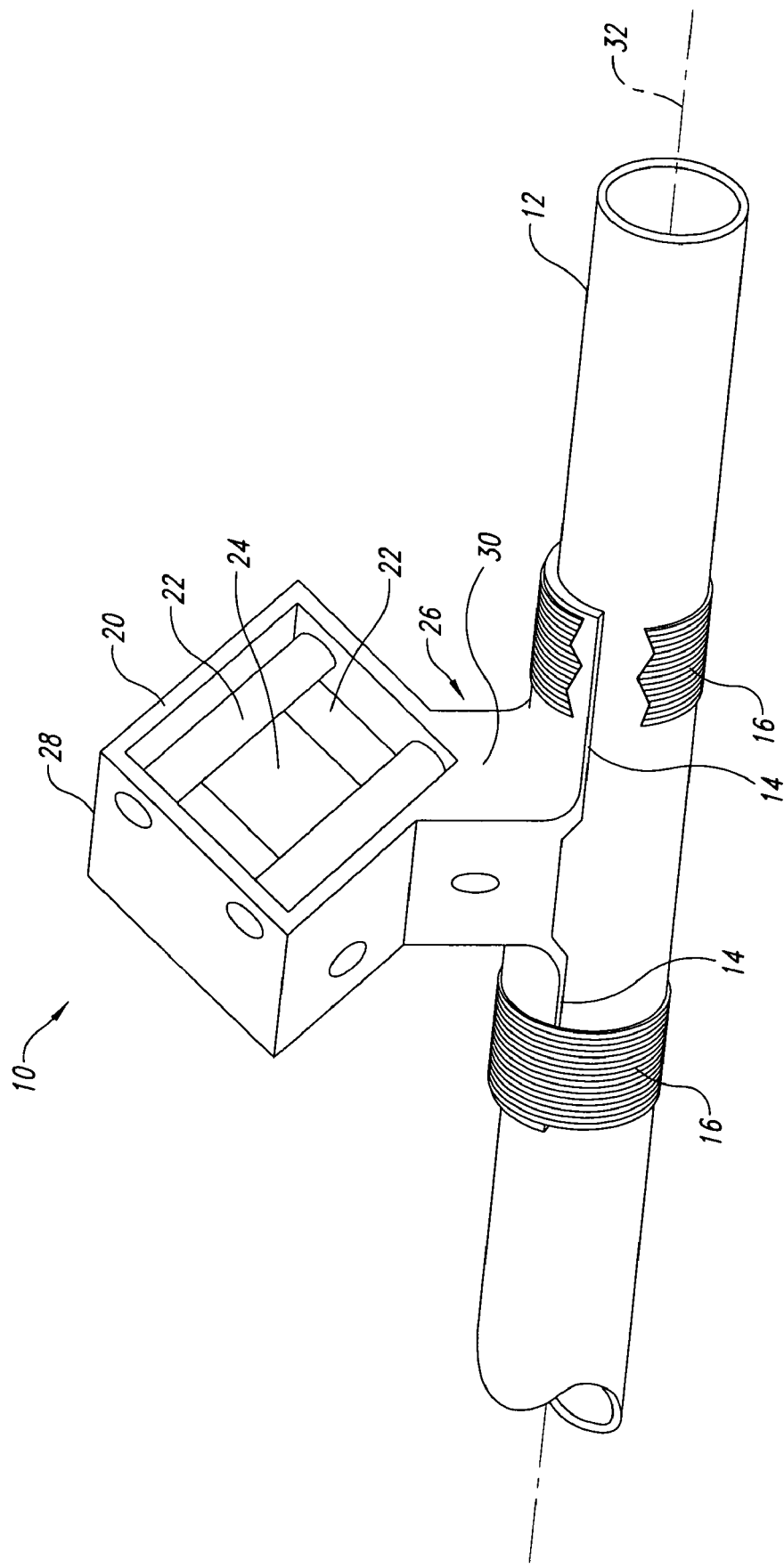
FIG. 4 is a front, left side isometric view of the fishing rod blank and line guide of FIG. 3.

FIG. 4 better illustrates the line guide 10 according to this particular embodiment of the present invention. Mounting feet 14 secure the line guide 10 to the blank 12. The mounting feet 14 can be shaped to complement the circular-shaped blank 12. Thread 16 is generally used to attach the mounting feet 14 to the blank 12 by locating the feet 14 on the blank 12 and winding multiple turns of the thread 16 around the blank 12 and the foot 14. A layer of resin can then be poured onto the thread 16 and permitted to harden. The hardened resin secures the mounting feet 14 to the blank 12, seals the thread 16, and provides a smooth transitional surface between the thread 16 and the blank 12.

In the illustrated embodiment, the roller assemblies 22 are arranged to create a passageway 24. One advantage of this arrangement of the roller assemblies 22 is that it prevents the fishing line from making contact with any static or non-rotating components of the line guide 10, regardless of the orientation of the fishing rod while the angler is using the rod.

In the illustrated embodiment, the frame 20 can include a neck portion 26, which extends downward toward the mounting feet 14. The neck portion 26 can be integrally formed with the frame 20; however, one skilled in the art will appreciate that the mounting feet 14, the neck portion 26, and the frame 20 can instead be assembled from individual components, or some combination of the above.

In addition, the rectangular-shaped frame 20 is positioned so that an upper portion 28 and a lower portion 30 of the frame 20 are vertically aligned with the centerline 32 of the blank 12. The orientation of the frame 20 in this manner provides a structurally robust connection between the frame 20 and the neck 26 and permits the weight of the frame to be minimized. One skilled in the art will appreciate and understand that the frame 20 can be shaped (e.g., rectangular, circular, hexagonal, etc.) and oriented in many different ways.

Figure 5A:
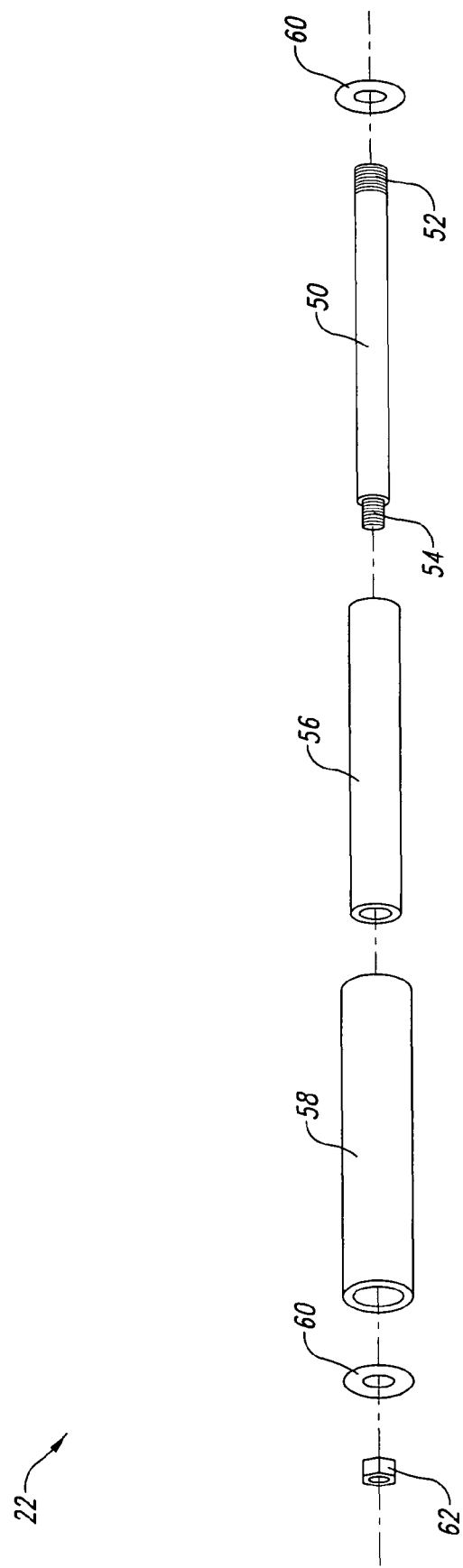
FIG. 5A is an exploded, diametric view of a roller assembly placed within a frame of a line guide according to another illustrated embodiment.

FIG. 5A illustrates a roller assembly 22 according to one embodiment of the present invention. The roller assembly includes a pin 50, a first sleeve 56, and a second sleeve 58. The pin 50 has a first end 52 and a second end 54. In one embodiment, the pin 50 can be made from corrosion resistant stainless steel (CRES) and coated with Teflon® or some other type of friction-reducing coating. The first end 52 is threaded and can be received by the frame. The first sleeve 56 slides over the pin 50 and remains free to rotate on the pin. In addition, the second sleeve 58, which can be made with a hard rubberized or non-slip material, can be placed over the first sleeve 56. The second sleeve 58 can have a tight fit relative to the first sleeve 56 so that the two sleeves 56 and 58 are rotationally coupled. The second sleeve 58 can be coupled to the first sleeve 56 with an adhesive, through a press fit operation, or some other joining method, for example. Washers 60 can be used to provide a bearing surface between the rotating sleeves 56 and 58 and the interior surfaces of the frame. The second end 54 of the pin 50 can be secured to the frame with a nut 62.

Figure 10:
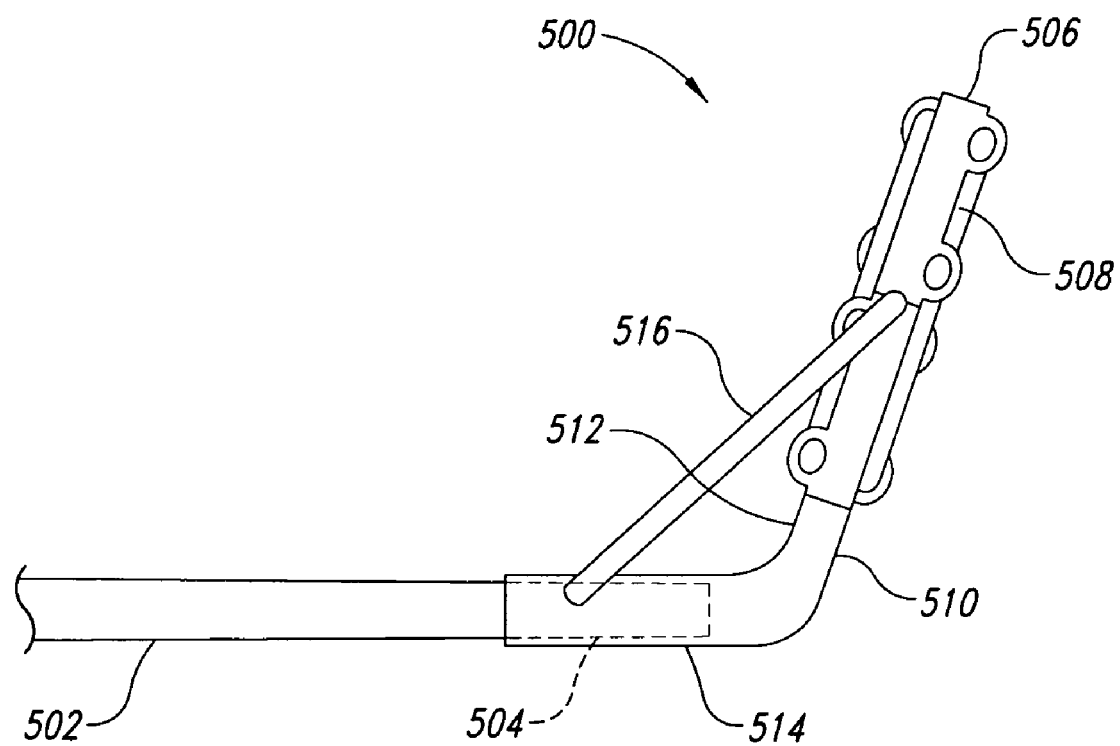
FIG. 10 is a side elevational view of a tip-top line guide according to one illustrated embodiment.

The non-slip material of the second sleeve 58 permits the fishing line to grip the roller assembly 22. The tension in the fishing line combined with the non-slip action between the fishing line and the second sleeve 58 results in both sleeves 56 and 58 being rotated at substantially the same rate. The roller assembly 22 of the present embodiment can be utilized with any of the line guide embodiments discussed herein, to include the tip-top line guide 500 (FIG. 10). One skilled in the art will appreciate and understand that the roller assembly 22 of the present embodiment can be configured without a second sleeve 58 and further that the first sleeve 56 can be coated with non-slip coating in lieu of providing the second sleeve 58, for example.

Figure 5B:
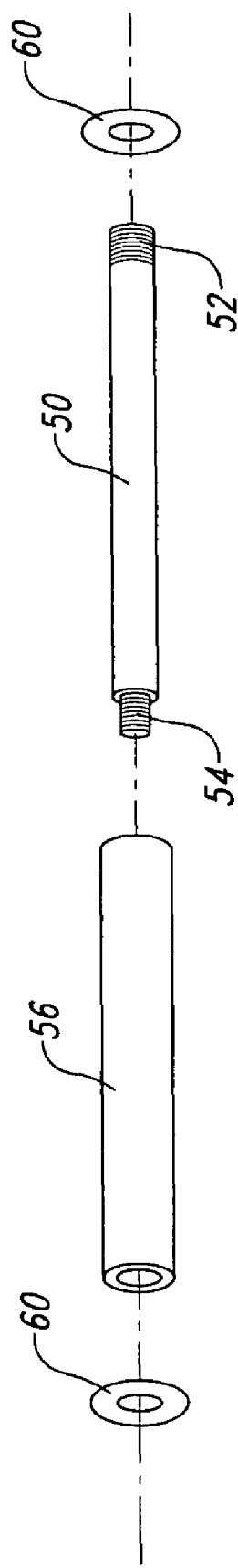
FIG. 5B is an exploded, diametric view of the roller assembly of FIG. 5A having a single sleeve.

FIG. 5B illustrates the pin 50 having the first end 52 and the second end 54 is received by the frame of the line guide by inserting the pin 50 through an opening in the frame in a downward direction. The first end 52 is secured to the upper portion of the frame while the second 54 is secured to the lower portion of the frame. The first sleeve 56, in the illustrated embodiment, is made with a hard rubberized or non-slip material.

Figure 7:
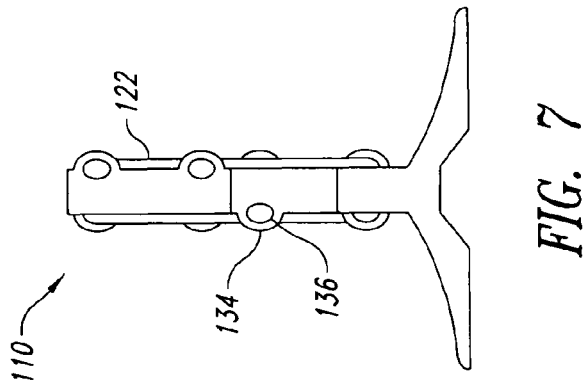
FIG. 7 is a side elevational view of the line guide of FIG. 6.
Figure 6:
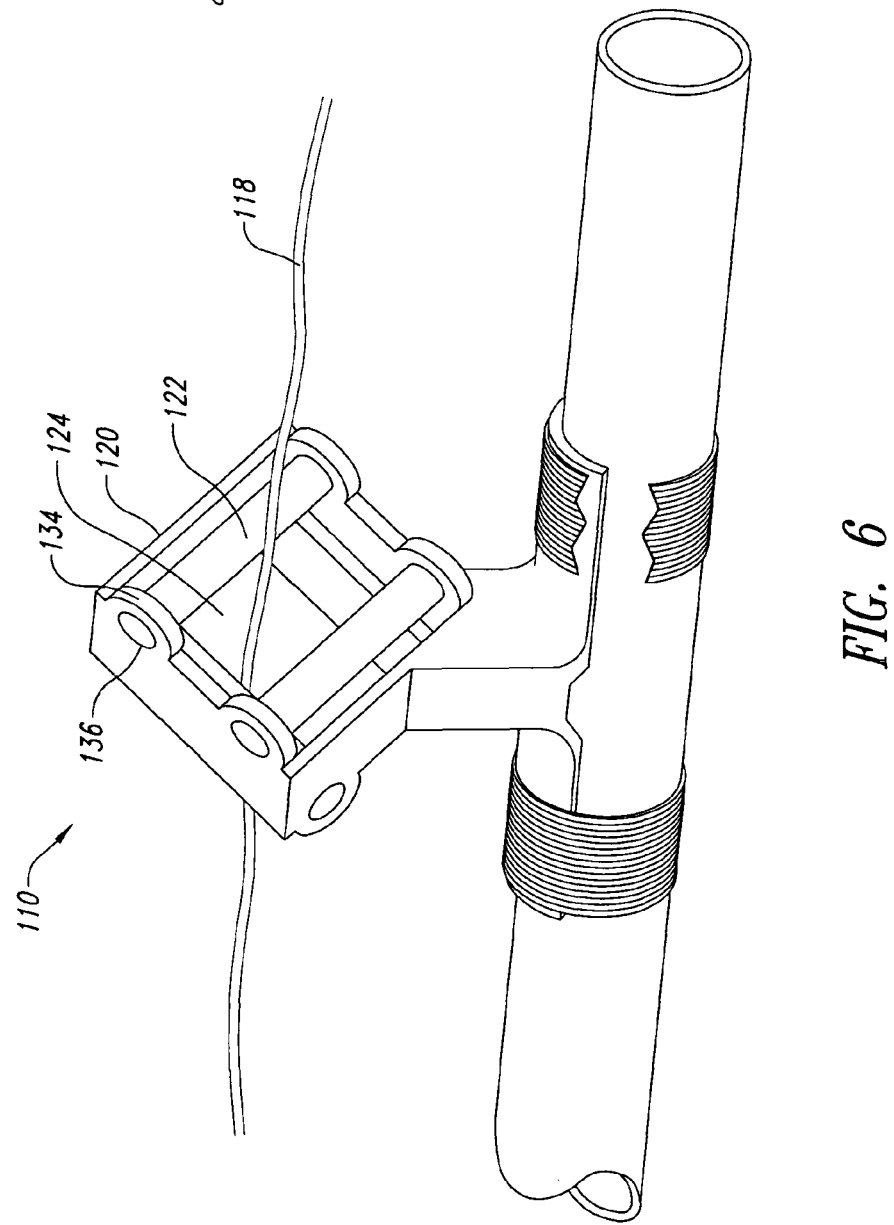
FIG. 6 is a is a front, left side isometric view of a fishing rod blank with an attached line guide having a frame with a slim profile according to another illustrated embodiment.

FIGS. 6 and 7 illustrate a line guide 110 according to another embodiment of the invention. In the illustrated embodiment, a rectangular-shaped frame 120 captures the roller assemblies 122. The fishing line 118 is illustrated extending through the passageway 124 formed by the roller assemblies 122.

The line guide 110 includes a frame 120 with laterally extending projections 134 having openings 136 for receiving the roller assemblies 122. The projections 134 permit the line guide 110 to have a reduced or slimmed-down profile. One advantage of a slimmer profile is that it reduces wind resistance when casting. Another advantage is that the slimmer profile reduces the overall weight of the line guide 110 and as discussed above, this can affect the amount of rod action in the rod. A slimmer profile, which reduces portions of the frame that are non-moving, decreases the likelihood that the fishing line will come into contact with the non-moving parts of the frame regardless of the rod's orientation.

Figure 8A:
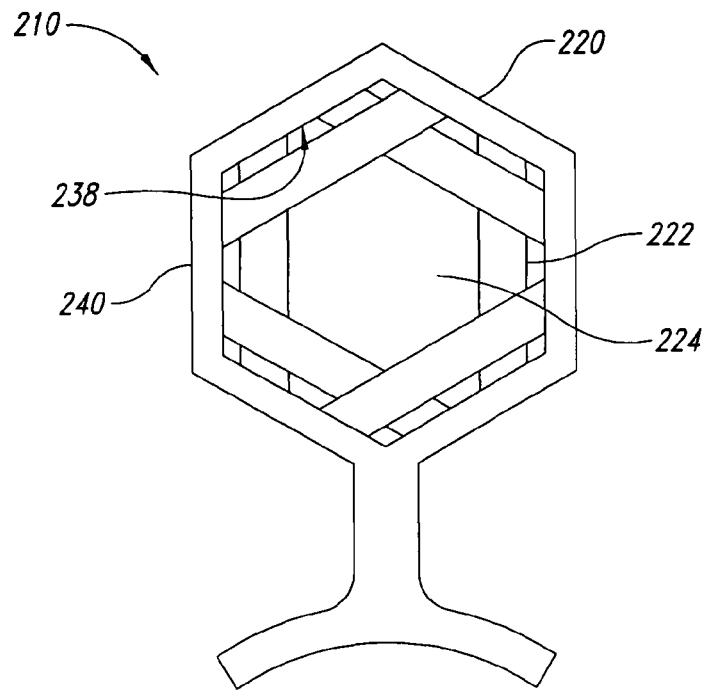
FIG. 8A is a front elevational view a hexagonal-shaped line guide according to one illustrated embodiment.
Figure 8B:
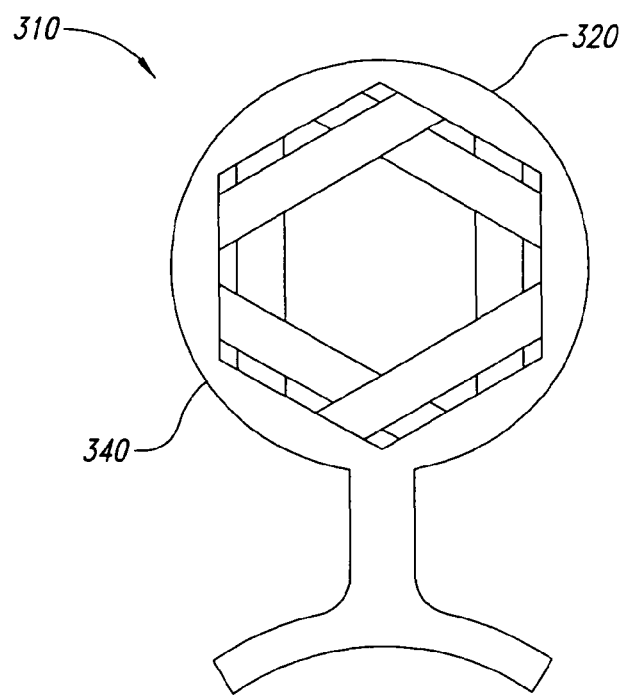
FIG. 8B is a front elevational view of the hexagonal-shaped line guide of FIG. 8A with a rounded outer circumference.

FIGS. 8A and 8B provide two more embodiments of a frame 220, each with a slightly different shape. FIG. 8A illustrates a hexagonal-shaped frame 220 having six interior sides 238 and six exterior sides 240. The roller assemblies 222 form a passageway 224. FIG. 8B illustrates a hexagonal-shaped frame 320 having an outer circumference is round or circular, thus essentially having only one exterior side 340. One skilled in the art will understand and appreciate that the outer circumference of the frame 320 can be machined or manufactured to have a smooth, round contour, regardless of the shape of the interior circumference of the frame 320.

Figure 9A:
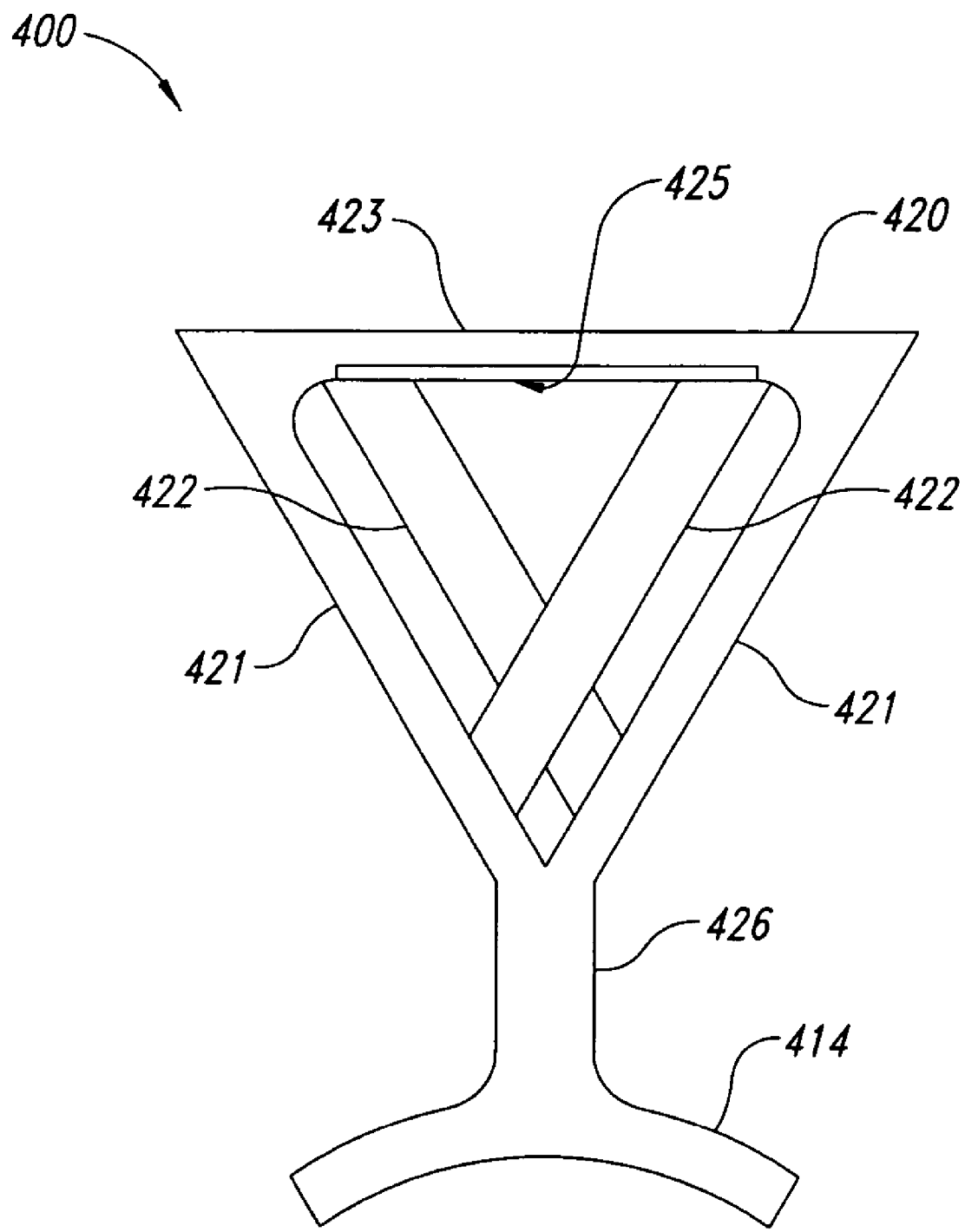
FIG. 9A is a front elevational view of a triangular-shaped line guide having a V-shaped roller configuration according to one illustrated embodiment.

FIG. 9A illustrates a line guide 400 according to yet another embodiment of the invention. The line guide 400 of the illustrated embodiment has mounting feet 414 and a frame 420, where the frame is coupled to the mounting feet by a neck 426. The frame 420 is triangular-shaped with two frame members 421 forming a V-shape and an upper, horizontal frame member 423 enclosing the frame. A pair of roller assemblies 422 are rotationally coupled between the V-shaped frame members 421 and the horizontal frame member 423. An interior surface 425 of the upper frame member 423 includes a rounded contour for allowing the fishing line to smoothly glide over the interior surface upon contact therewith.

Figure 9B:
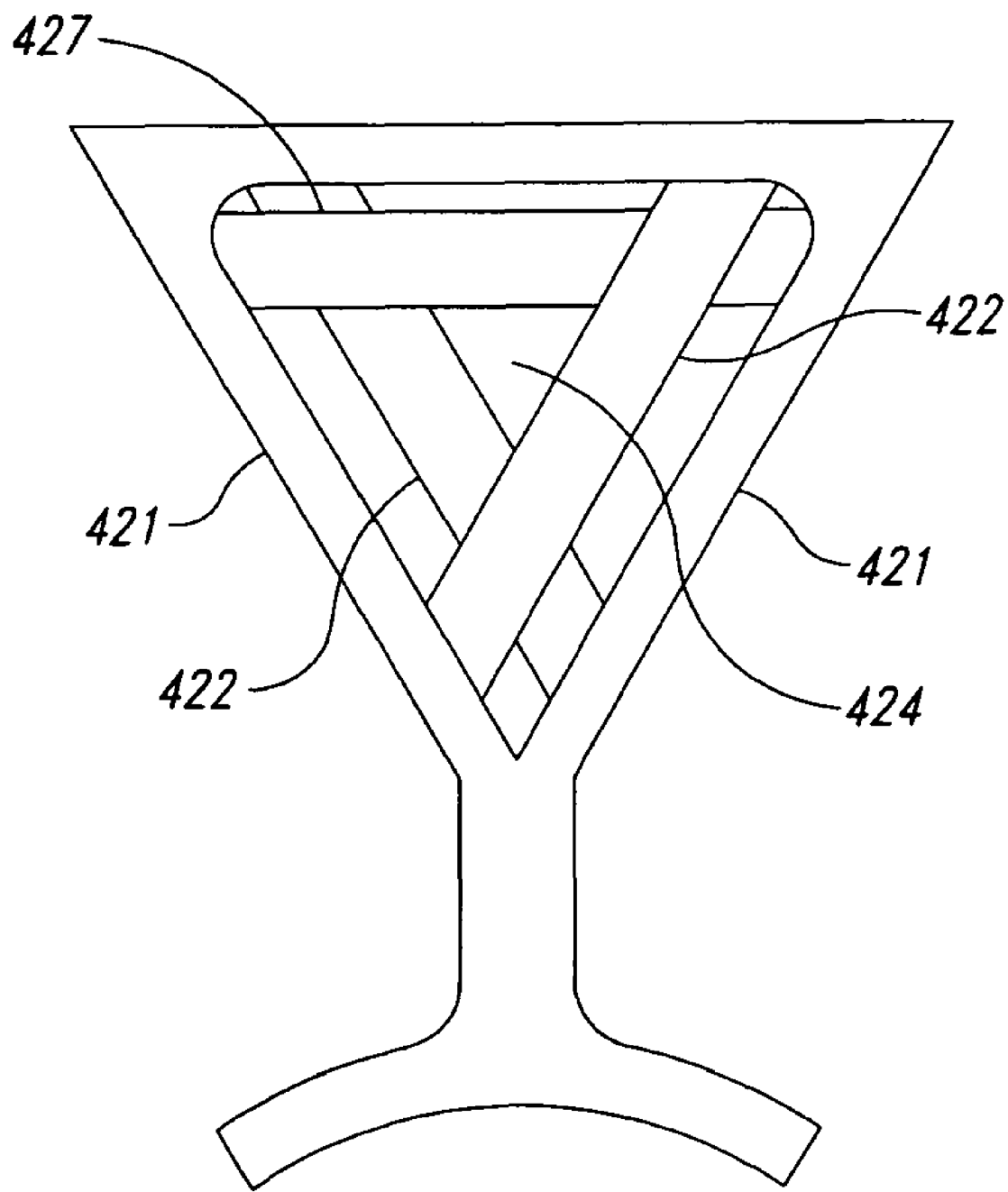
FIG. 9B is a front elevational view of the triangular-shaped line guide of FIG. 9A having three overlapping rollers according to another illustrated embodiment.

Alternatively, FIG. 9B illustrates that a third roller assembly 427 can span the distance between the V-shaped frame members 421. In such an embodiment, the roller assemblies 422 and 427 are arranged to form an enclosed passageway 424 in which the fishing line will be contained.

FIG. 10 illustrates a tip-top line guide 500 according to one embodiment of the present invention. The tip-top line guide 500 is seated on the tip or end of the fishing rod 502 and must be securely attached to the tip 504 of the rod order to prevent the tension of the fishing line from twisting or prying off the tip-top line guide 500. The tip-top line guide 500 includes a frame 506, roller assemblies 508, and an attachment sleeve 510. The attachment sleeve 510 further includes a distal portion 512 for connecting with the frame 506 and a proximal portion 514 for receiving the tip 504 of the rod 502. In addition, support braces 516 can be used to securely attach the frame 506 to the rod tip 504.

Figure 11:
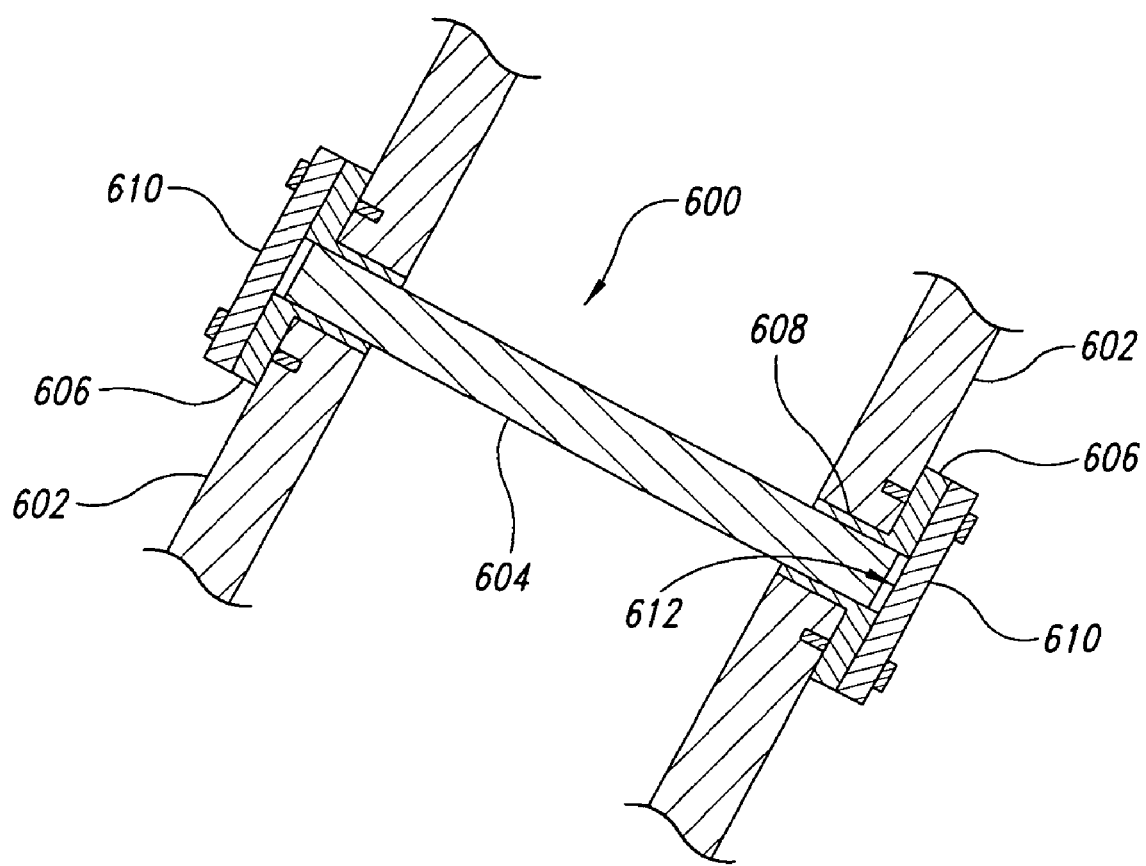
FIG. 11 is an exploded isometric view of a roller assembly used in a line guide according to one illustrated embodiment.

FIG. 11 illustrates a cross sectional view of a roller assembly 600 rotationally secured to a frame 602 according to another embodiment of the present invention. The roller assembly 600 includes a pin 604 receivably and rotationally coupled between two bearings 606. The bearings 606 can be press fit or simply slid into openings 608 provided in the frame 602. A cap 610 is used to secure the bearings 606 with the frame 602 and thus axially restrain the pin 604. An inner surface 612 of the cap 610 can also act as a bearing surface in the event the pin 604 is displaced to one side of the frame 602 or the other.

Figure 12:
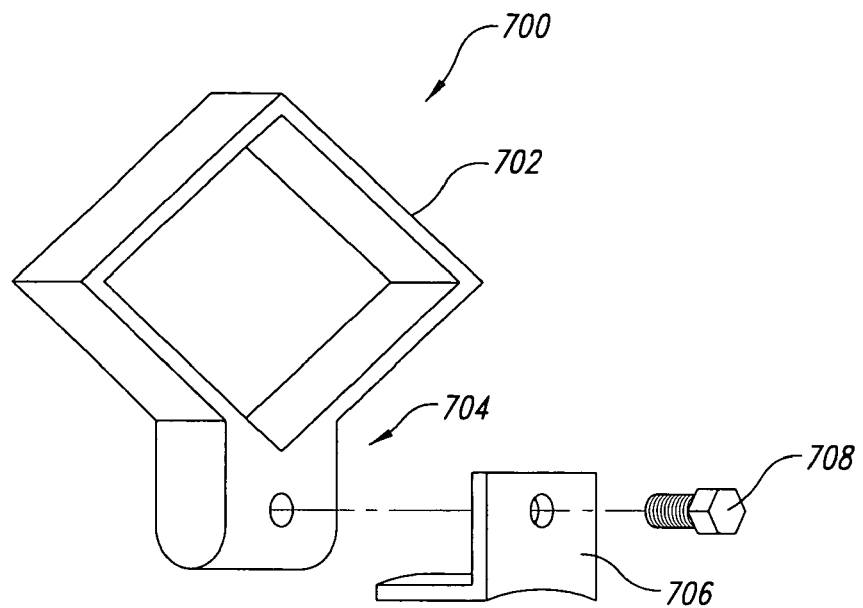
FIG. 12 is an exploded, front left isometric view of a line guide frame and a separate mounting foot according to one illustrated embodiment.

Referring now to FIG. 12, a line guide 700 is assembled with a frame 702 and an integrally formed neck 704. The attachment of the frame 702 to the fishing rod (not shown) is accomplished by attaching the neck 704 with a single, flexible mounting foot 706. The flexibility of such an attachment is better suited for lighter weight fishing rod. The illustrated mounting foot 706 is bolted to the frame 708; however, one skilled in the art will appreciate that the attachment of the frame 702 to the mounting foot 706 can be accomplished in a number of ways, for example bonding, snapping together, etc.

Figure 13:
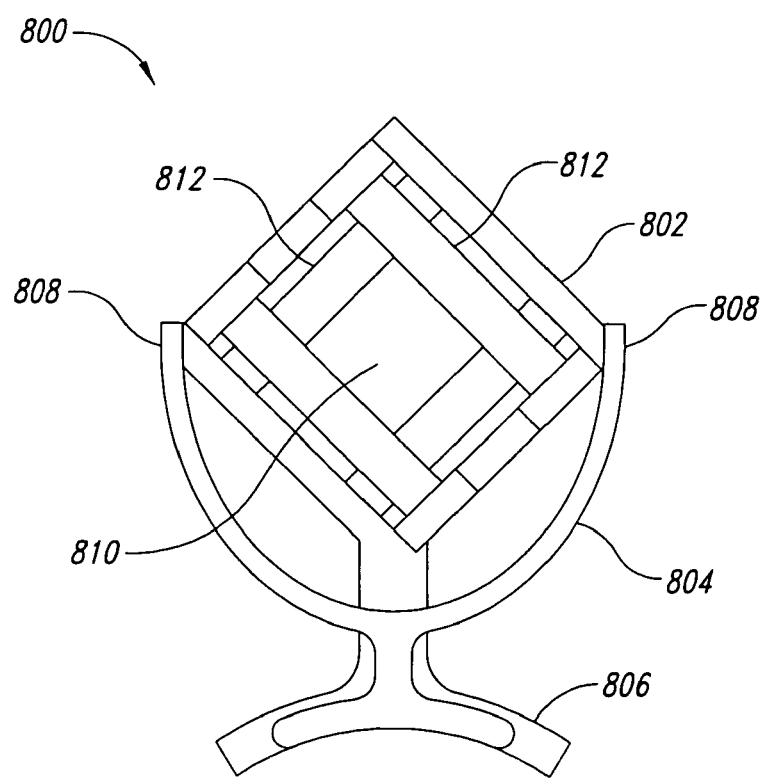
FIG. 13 is a front elevational view of a line guide pivotally attached to a mounting bracket according to one illustrated embodiment.
Figure 14:
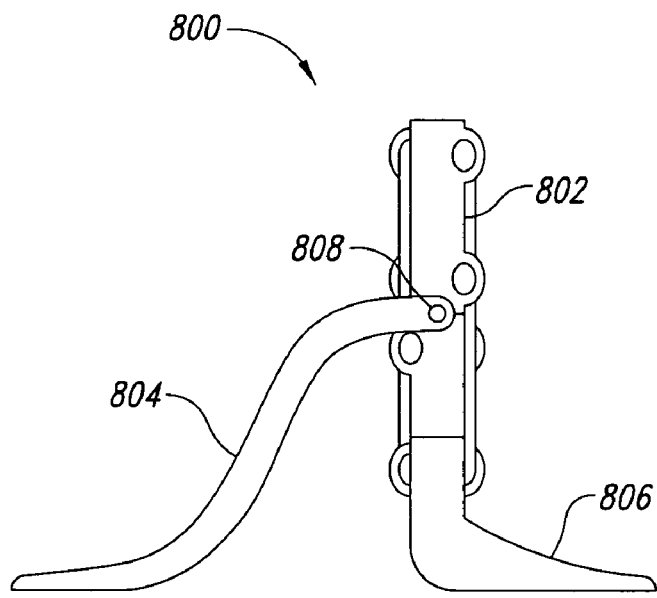
FIG. 14 is a side elevational view of the line guide and mounting bracket of FIG. 13.

FIGS. 13 and 14 illustrate a line guide 800 with a frame 802 is attached to a mounting bracket 804 according to yet another embodiment of the present invention. The line guide 800 is very similar to the line guide described in FIG. 4, except the illustrated line guide 800 has only one mounting foot 806. In order to provide a more flexible, but robust attachment with the fishing rod (not shown), the mounting bracket 804 is pivotally mounted to the frame 802 at a pivot location 808. This extra degree of freedom between the frame 802 and the fishing rod provides the line guide 800 with the ability to slightly pivot relative to the mounting bracket 804. The mounting bracket 804 is U-shaped so it does not interfere with the fishing line (not shown) passing through the passageway 810 formed by the roller assemblies 812. Alternatively, the mounting bracket 804 can be fixed with the frame in the event that extra flexibility is not desired.

Figure 15:
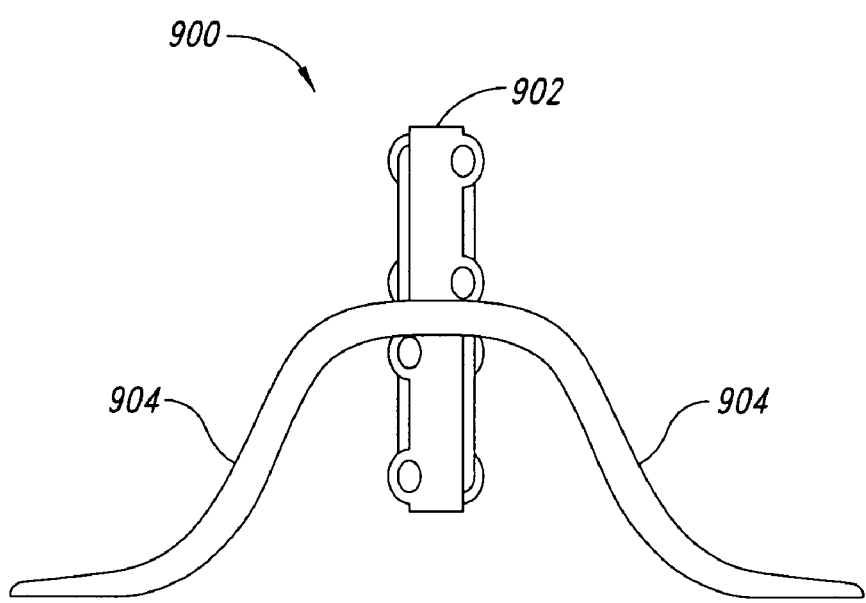
FIG. 15 is a front elevational view of a line guide fixed to a pair of opposing mounting brackets according to one illustrated embodiment.

FIG. 15 illustrates a line guide 900 with a frame 902 fixed (i.e., welded) to a mounting bracket 904 according to yet another embodiment of the present invention. The line guide 900 is similar to the line guide described above except the illustrated line guide 900 includes opposing flexible mounting brackets 904 fixed with the frame 902.

Figure 16:
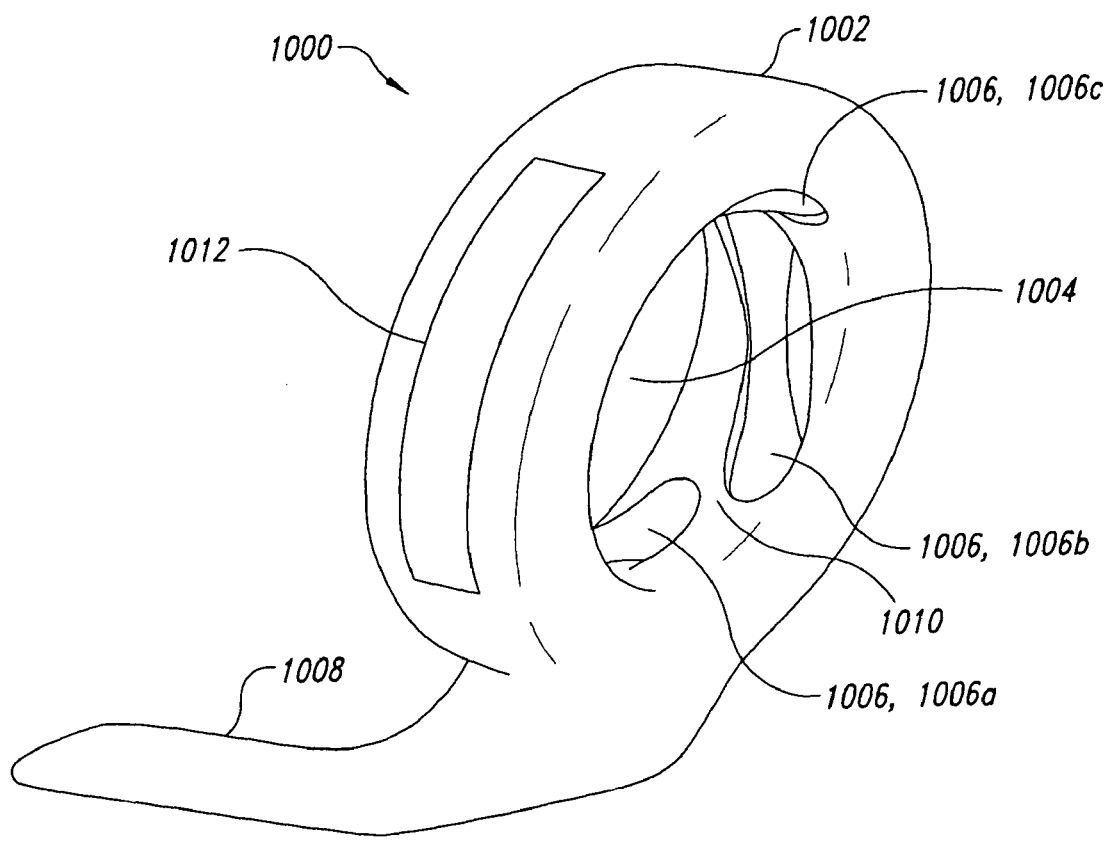
FIG. 16 is a rear, left side isometric view of a line guide according to one illustrated embodiment.

FIG. 16 shows a line guide 1000 according to another embodiment of the invention. In the illustrated embodiment, a generally circular frame 1002 encloses a passageway 1004 that extends through the frame 1002. Rotationally coupled to the frame 1002 are a number of rollers 1006, which are disposed around the passageway 1004 and specifically referenced as the lower roller 1006a, the side rollers 1006b, and the upper roller 1006c. The frame 1002 further includes a mounting foot 1008 for securing and/or attaching the line guide 1000 to a fishing rod (not shown). A portion 1010 of the frame 1002 separates each adjacent pair of rollers 1006 and is complimentarily contoured with the roller 1006 to form a smooth transition between the rollers 1006. Caps 1012 can be coupled to the frame 1002 for retaining the rollers 1006 in the frame.

Figure 17:
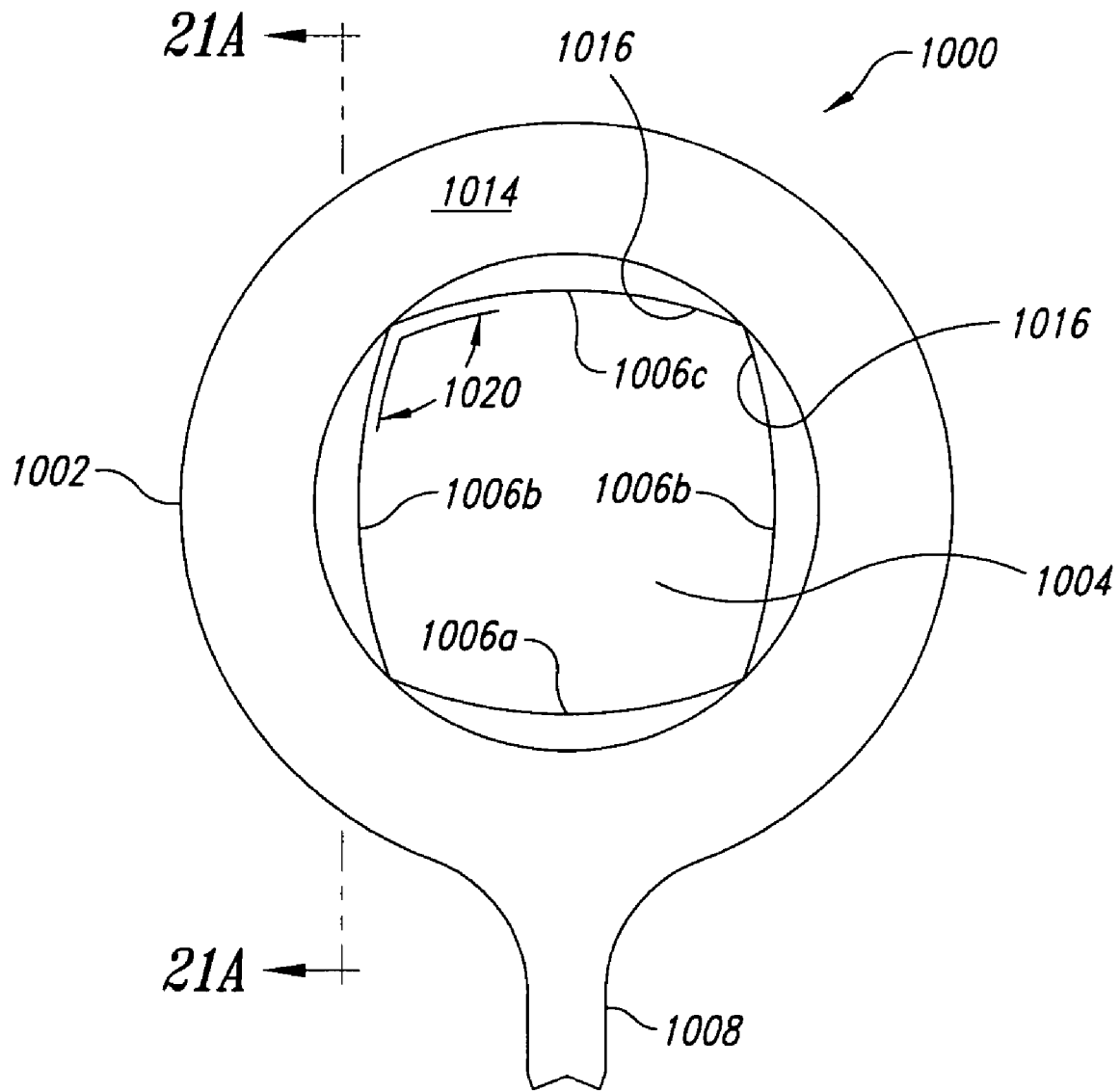
FIG. 17 is a front, elevational view of the line guide of FIG. 16.
Figure 18:
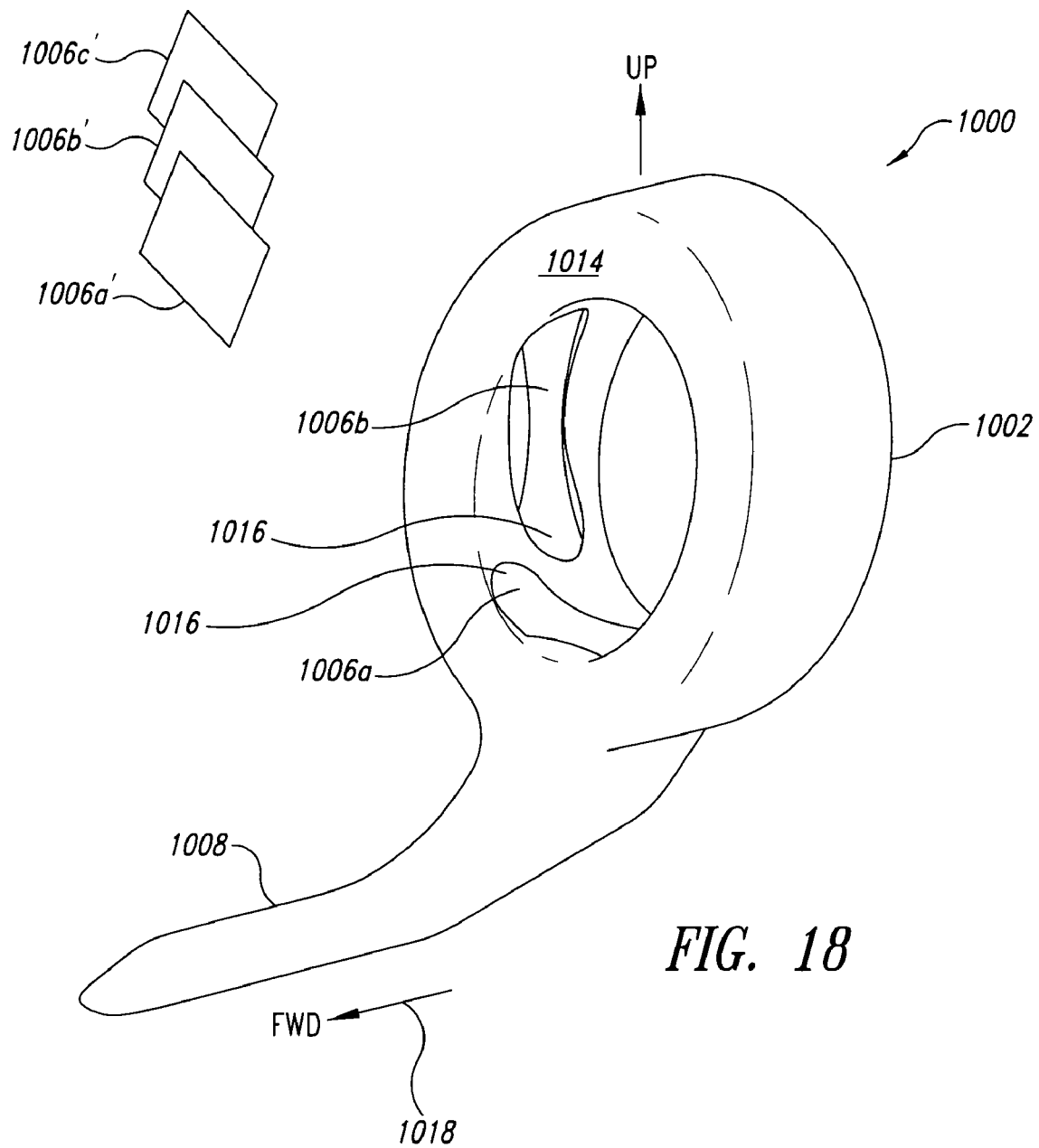
FIG. 18 is a front, left side isometric view of the line guide of FIG. 16.

FIGS. 17 and 18 show that the rollers 1006 are arranged in the frame 1002 to completely encompass the passageway 1004, according to the illustrated embodiment. The rollers 1006 are arranged in three different planes, 1006a', 1006b', and 1006c', as best seen in FIG. 18. The respective planes 1006a', 1006b', and 1006c' are substantially parallel to a first surface 1014 of the frame 1002. In addition, the rollers 1006 are further arranged such that the end portions 1016 of adjacent rollers overlap one another when viewed along a first direction 1018 (FIG. 18). In addition, the adjacent end portions 1016 of the rollers 1006 form an obtuse angle 1020 (90<1020<180 degrees) with one another.

Figure 19:
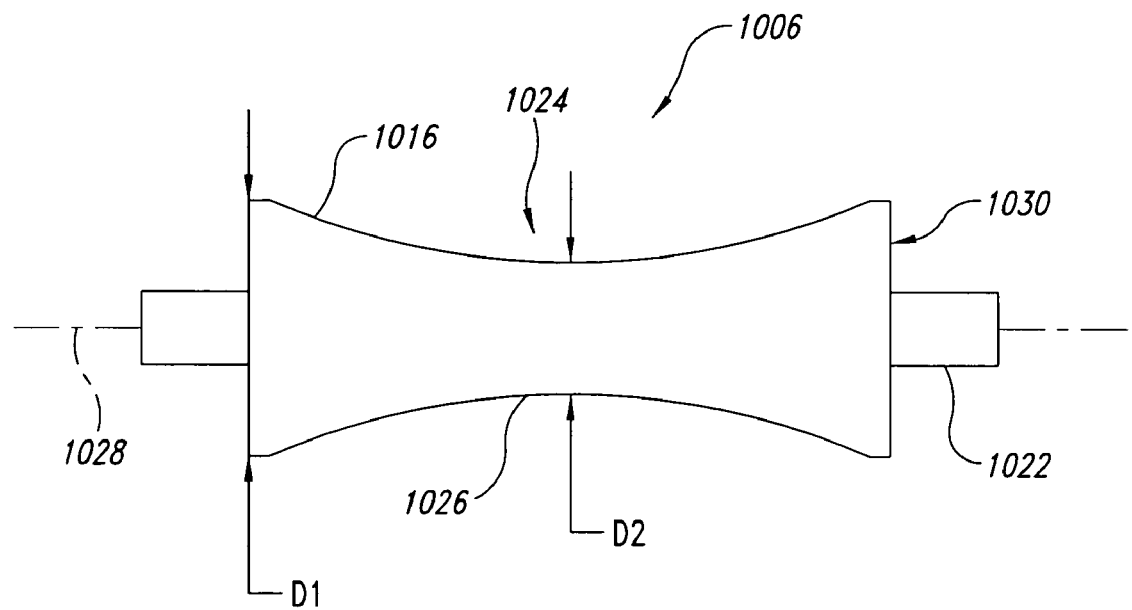
FIG. 19 is a side, elevational view of a rotatable member having spindles according to one illustrated embodiment.

FIG. 19 best shows one of the rollers 1006, according to one illustrated embodiment. The roller 1006 includes a pair of spindles 1022 connected by a roller body 1024. The roller body 1024 includes the end portions 1016 connected by a central portion 1026. Each end portion 1016 has a first outer diameter D1 and tapers toward the central portion 1026, which has a second outer diameter D2. The second outer diameter D2 of the central portion 1026 is smaller than the first outer diameter D1 of the respective end portion 1016 such that the roller body 1024 can have an hourglass shape. The spindles 1022 extend axially and oppositely, in line with a rotation axis 1028 of the roller 1006. Each of the end portions 1016 includes a roller end surface 1030 that can be substantially perpendicular to the rotation axis 1028. It is understood and appreciated that the rollers 1006 are sized according to the type of and/or purpose of the fishing rod onto which they are to be mounted. Thus, larger rollers 1006 with thick spindles 1022 may be required for deep-sea sport fishing, whereas small rollers with small spindles may be used when ice fishing for small perch.

Figure 20:
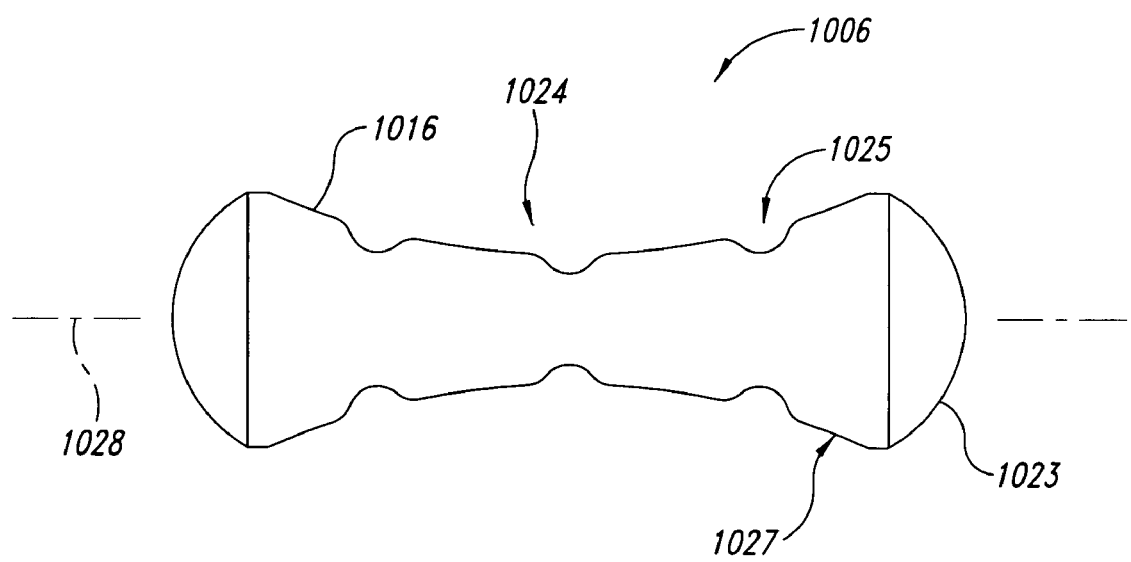
FIG. 20 is a side, elevational view of a rotatable member having rounded bearing surfaces according to alternative illustrated embodiment.

FIG. 20 shows an alternate embodiment of the roller 1006 where instead of the spindles 1022, the roller incorporates rounded bearing surfaces 1023. Additionally or alternatively, the roller 1006 can include at least one smooth-transitioning groove 1025 and/or a surface treatment 1027. The groove 1025 is shown as an annular groove, however the groove 1025 can be formed at an angle, other than perpendicular, in relation to the axis 1028 of the roller 1006. The groove 1025 may help stabilize the location of the fishing line on the roller 1006 during operation and may also encourage the roller 1006 to roll more efficiently and smoothly because the annular groove 1025 provides more contact area between the fishing line and the roller 1006.

The surface treatment 1027 can be in addition to or as an alternate to the grooves 1025. The surface treatment 1027 can be a texturing, a coating, or other similar treatment that increases, or at least enhances, the amount of friction between the roller 1006 and the fishing line. In one embodiment, the surface treatment 1027 is a textured coating sprayed on the roller 1006, similar to the type of non-slip, hardened coatings that are typically used to cover a cement floor, stairs, and/or a pick-up truck bed.

FIGS. 21A and 21B show the roller 1006b relative to an opening 1032 formed in a portion of the frame 1002 according to the illustrated embodiment. FIG. 22 shows the same portion of the frame 1002 without the roller 1006b for clarity. Hence, FIG. 22 shows that a bushing 1034 can be positioned in the frame 1002 to act as a bearing surface for the roller 1006. FIG. 23 shows an alternate embodiment where the shape of the opening 1032 compliments the hourglass shape of the roller 1006.

Figure 24:
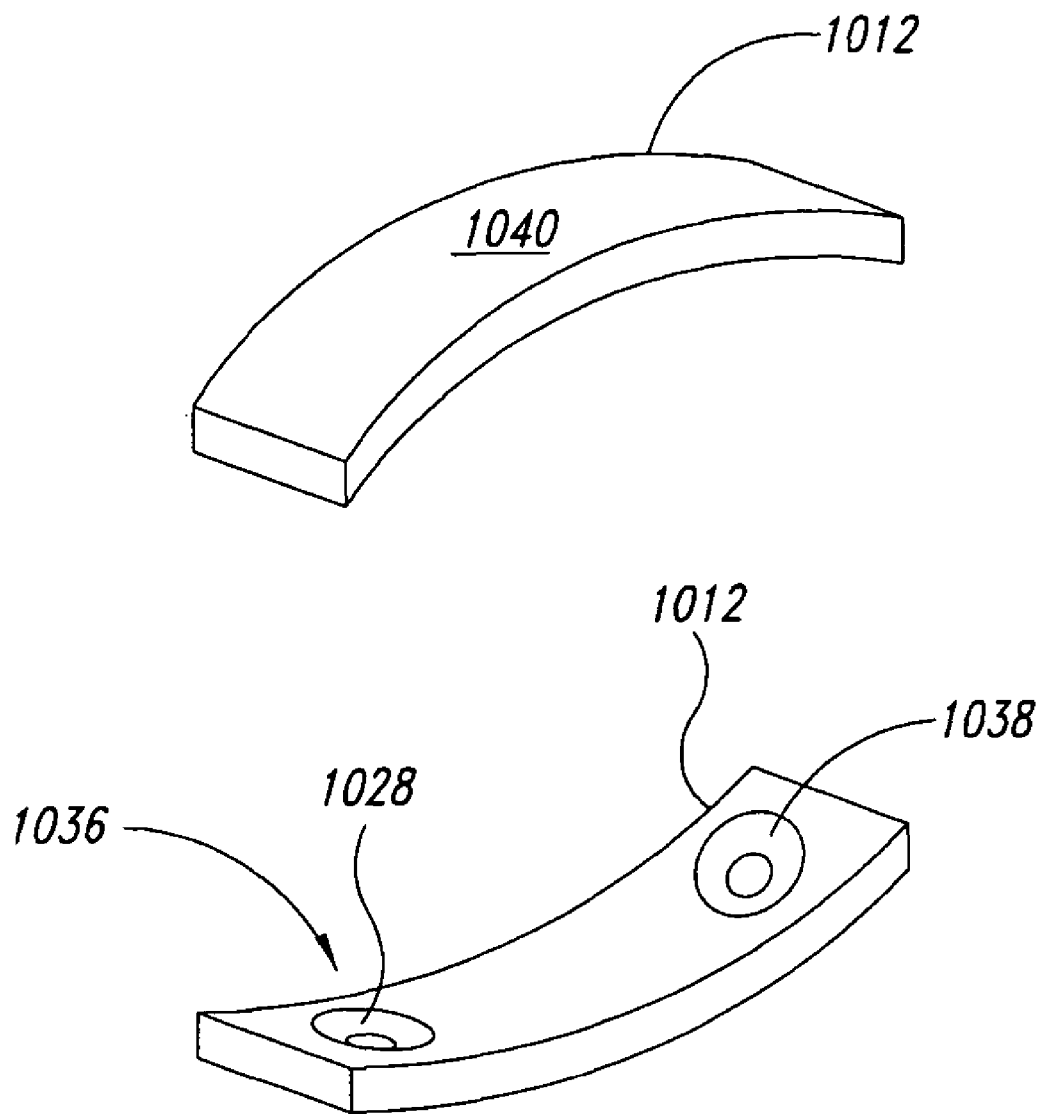
FIG. 24 is an isometric, exploded view of a pair of caps for a frame of a line guide according to one illustrated embodiment.

FIG. 24 shows the caps 1012 that couple to the frame 1002 according to one illustrated embodiment. The cap 1012 includes two recessed pockets 1036 that include counter bearing surfaces 1038 to complimentarily receive the rounded bearing surfaces 1023 of the embodiment shown in FIG. 20. The cap 1012 forms an elongated arc with a smooth outer surface 1040 so that a smooth transition is maintained between the cap 1012 and the frame 1002. The cap 1012 can be mechanically secured to the frame 1002, for example by being press fit into the frame 1002, by being clipped into the frame 1002, and/or by some other similar, mechanical attachment means. Although not shown, the recessed pockets 1036 and bearing surfaces 1038 can be alternatively configured to receive the spindles 1022 and roller end portions 1030 of the embodiment shown in FIG. 19.

These and other changes can be made to the invention in light of the above-detailed description. In general, in the following claims, the terms used should not be construed to limit the invention to the specific embodiments disclosed in the specification and the claims, but should be construed to include all line guide mechanisms that operate in accordance with the claims. Accordingly, the invention is not limited by the disclosure, but instead its scope is to be determined entirely by the following claims.

I claim:

1. A line guide for a fishing rod, the guide comprising:
   a circular frame having a substantially cylindrical passageway extending through the frame in a first direction substantially parallel with a longitudinal axis extending the length of the fishing rod;
   a first roller having a first rotation axis, the first roller rotatably coupled to the frame and rotatable about the first rotation axis in approximately a first plane, wherein the first plane extends through the first axis and is substantially perpendicular to the longitudinal axis such that a normal of the first plane is substantially parallel with the first direction;
   a second roller having a second rotation axis, the second roller rotatably coupled to the frame and rotatable about the second rotation axis in approximately a second plane, wherein the second plane extends through the second axis and is parallel to and axially offset from the first plane;
   a third roller having a third rotation axis that is substantially parallel to the first rotation axis, the third roller rotatably coupled to the frame and rotatable about the third rotation axis in approximately a third plane, wherein the third plane extends through the third axis and is parallel to and axially offset from both the first plane and the second plane, respectively;
   a fourth roller having a fourth rotation axis, the fourth roller rotatably coupled to the frame in a parallel arrangement with the second roller; and
   a pair of elongated caps, each cap having an arced outer surface substantially continuous with an outer surface of the circular frame and including at least one bearing surface at each end of the cap, each bearing surface configured to rotatably receive a portion of at least one of the rollers such that each cap rotatably receives at least two rollers.

2. The line guide of claim 1 wherein the frame is integrally formed with at least one mounting foot.

3. The line guide of claim 1, further comprising:
   a bushing received in the frame, the bushing sized to closely receive a portion of one of the respective rollers.

4. The line guide of claim 1 wherein, when viewing the rollers in the first direction, the first rotation axis of the first roller is substantially perpendicular to the second rotation axis of the second roller and an angle formed between a surface of each of the first and second rollers is an obtuse angle.

5. A line guide for a fishing rod, the guide comprising:
   a circular frame having a substantially cylindrical passageway extending through the frame in a first direction substantially parallel with a longitudinal axis extending the length of the fishing rod;
   a first roller having a first rotation axis, the first roller rotatably coupled to the frame and rotatable about the first rotation axis in approximately a first plane, wherein the first plane extends through the first axis and is substantially perpendicular to the longitudinal axis such that a normal of the first plane is substantially parallel with the first direction;
   a second roller having a second rotation axis, the second roller rotatably coupled to the frame and rotatable about the second rotation axis in approximately a second plane, wherein the second plane extends through the second axis and is parallel to and axially offset from the first plane;
   a third roller having a third rotation axis that is substantially parallel to the first rotation axis, the third roller rotatably coupled to the frame and rotatable about the third rotation axis in approximately a third plane, wherein the third plane extends through the third axis and is parallel to and axially offset from both the first plane and the second plane, respectively;
   a fourth roller having a fourth rotation axis, the fourth roller rotatably coupled to the frame in a parallel arrangement with the second roller; and
   a pair of elongated caps, each cap disposed in the outer surface of the frame and having an arced outer surface having a diameter the same as a diameter of the circular frame and including at least one bearing surface at each end of the cap to rotatably receive a portion of at least one of the rollers at each end of the cap,
   wherein, the first, second, third and fourth rollers are disposed around the perimeter of the cylindrical passageway of the circular frame such that, when viewing the rollers in the first direction, an end portion of each roller overlaps with an end portion of another roller to substantially prevent fishing line substantially aligned in an axis parallel to the longitudinal axis from contacting the frame when the fishing line is disposed inside the frame between the rollers.

* * * * *